(12) United States Patent
Bloom et al.

(10) Patent No.: US 9,675,045 B2
(45) Date of Patent: Jun. 13, 2017

(54) REDUCED NOISE TAG HANGER

(71) Applicant: Playday Labs Inc., Minneapolis, MN (US)

(72) Inventors: Daniel A. Bloom, Hartford, VT (US); Jennifer Posthumus, Minneapolis, MN (US)

( * ) Notice: Subject to any disclaimer, the term of this patent is extended or adjusted under 35 U.S.C. 154(b) by 0 days.

(21) Appl. No.: 15/043,732

(22) Filed: Feb. 15, 2016

(65) Prior Publication Data

US 2016/0247422 A1    Aug. 25, 2016

Related U.S. Application Data

(60) Provisional application No. 62/118,533, filed on Feb. 20, 2015.

(51) Int. Cl.
*G09F 3/18* (2006.01)
*A01K 11/00* (2006.01)
*G09F 3/14* (2006.01)

(52) U.S. Cl.
CPC ............... *A01K 11/00* (2013.01); *G09F 3/14* (2013.01)

(58) Field of Classification Search
CPC .................................. A01K 11/00; G09F 3/14
USPC ....... 248/228.8, 230.9; 40/661, 662; 24/17 B
See application file for complete search history.

(56) References Cited

U.S. PATENT DOCUMENTS

| 3,161,929 | A | * | 12/1964 | Swett | A47K 10/12 |
| | | | | | 16/87.2 |
| 3,429,065 | A | * | 2/1969 | Long | A45C 13/42 |
| | | | | | 40/662 |
| 3,561,074 | A | * | 2/1971 | Mosher, Jr. | G09F 3/12 |
| | | | | | 24/17 B |
| 3,678,608 | A | * | 7/1972 | Minasy | E05B 73/0017 |
| | | | | | 40/662 |
| 4,187,628 | A | * | 2/1980 | Thompson | A45C 13/42 |
| | | | | | 40/661 |
| 6,367,426 | B1 | | 4/2002 | Schaible | |
| 6,735,894 | B2 | | 5/2004 | Crusenberry et al. | |
| 7,861,443 | B2 | | 1/2011 | Hill | |
| 7,877,844 | B2 | | 2/2011 | Nichols et al. | |
| 8,004,406 | B2 | | 8/2011 | Bleckmann et al. | |
| 8,281,749 | B2 | | 10/2012 | Dukes | |
| 8,413,357 | B1 | | 4/2013 | Hagen et al. | |

FOREIGN PATENT DOCUMENTS

ZA        EP 1836893 A1  *  9/2007  ............. A01K 11/00

* cited by examiner

*Primary Examiner* — Gwendolyn Baxter
(74) *Attorney, Agent, or Firm* — Dicke, Billig & Czaja, PLLC

(57) ABSTRACT

A tag hanger has a strap which can pass around a support structure, such as a D-ring on an animal collar, and a retainer assembly that clamps one or more tags to one end of the strap, restraining their motion to prevent noise caused by the tags jangling together. The other end of the strap attaches to the retainer assembly to secure the tag holder to the support structure. A blocking element can be included on the strap to prevent contact between the tags and the support structure. The retainer assembly can employ a hex-head bolt that serves as a base element and a threaded retainer shaft that passes through a retainer passage in the strap and through hanger passages in the tags; a nut threadably engaging the bolt can then serve as a clamping element to secure the tags to the strap.

15 Claims, 4 Drawing Sheets

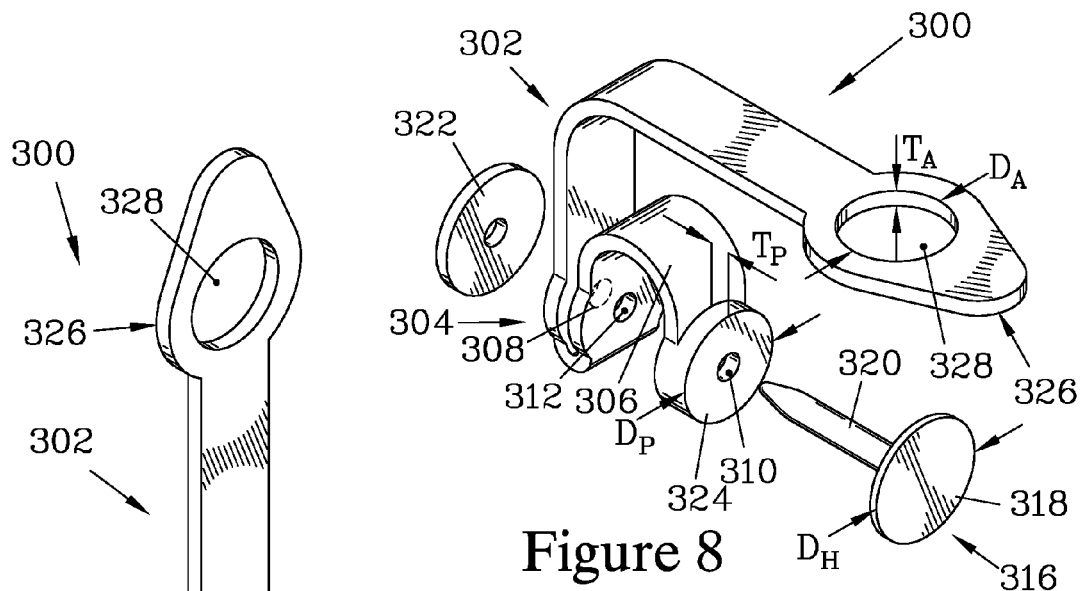
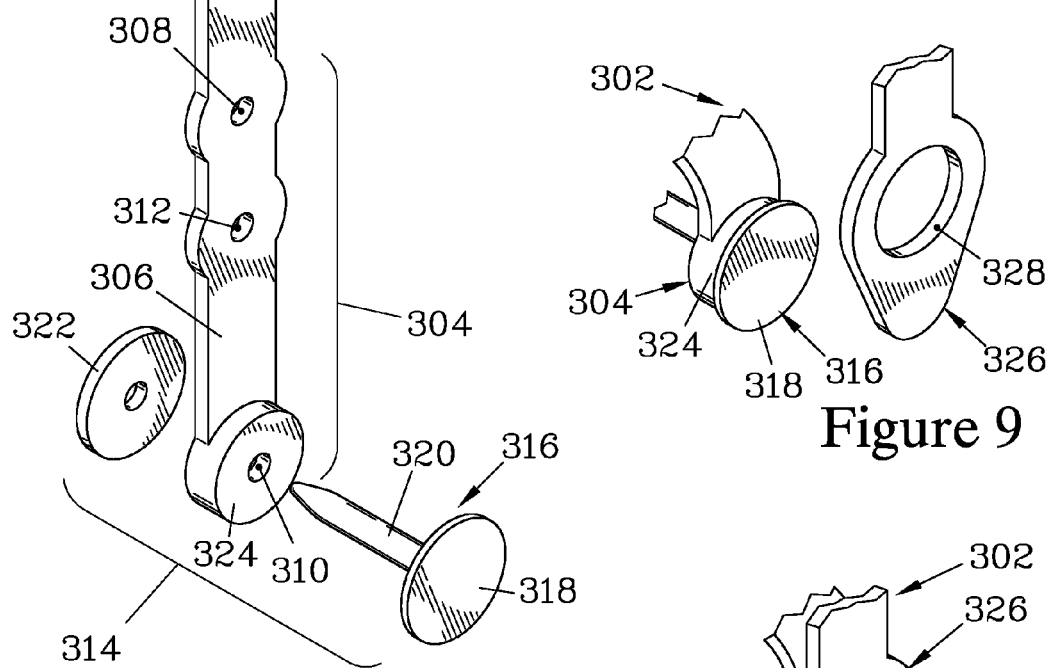
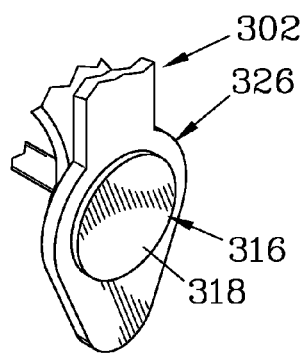

REDUCED NOISE TAG HANGER

BACKGROUND OF THE INVENTION

Animals such as dogs kept as pets frequently wear a collar with a number of metal tags attached thereto. Such tags can be marked with identification of the pet owner, information as to the animal's vaccination status, and/or registration information in locations where registration is required. These tags are typically attached to a support structure, such as a D-ring, on the collar via a split ring that passes though hanger passages on the tags. Because they are free to move relative to each other, they can strike together as the animal moves, creating a jangling noise that many owners find undesirable. Additionally, since the tags are typically formed from a relatively soft, easily-stamped metal such as aluminum, they are subject to wear from such movement.

One approach to suppressing the noise made by jangling tags is taught in U.S. Pat. No. 6,367,426. This patent teaches the use of a neoprene envelope in which the tags are enclosed and secured by straps that secure via hook-and-loop fasteners. While effective in reducing noise, the device of the '426 patent is overly large, as it must be sized to enclose the largest size of tags typically encountered. Additionally, owners have found that the envelope tends to collect dirt and debris when worn by animals that are active outdoors.

SUMMARY OF THE INVENTION

The tag hanger of the present invention removably attaches tags (such as pet licenses and identification tags) to a support element worn by an individual (such as a D-ring provided on a collar worn by a pet animal). The tag hanger reduces the noise of the tags jangling together when the wearer moves, as well as allowing the tags to be readily transferred to a different support element if desired. While discussed herein in terms of pet tags attached to a collar, the invention could be employed for alternative uses, such as for attaching military ID tags to a necklace while reducing noise created by the tags.

The tag hanger has a flexible strap which may be fabricated from leather or a polymer. The flexible strap has a strap first end region, having a first retainer passage therethrough, and a strap second end region.

To secure the tags to the strap, the tag hanger has a retainer assembly with two parts; the first part has a base element and a shaft extending from the base element and terminating in a shaft free end. The shaft is sized such that it can pass through hanger passages in the tags, and through the first retainer passage, while the first retainer passage blocks the passage of the base element therethrough. The second part of the retainer assembly is a clamp element into which the shaft can be inserted, and which grippably engages the shaft when positioned thereon to set a desired separation of the clamp element from the base element, with the tags interposed therebetween. Thus, the separation between the base element and the clamp element can be set such that the tags are held securely in side-by-side contact, thereby eliminating free motion therebetween to prevent jangling, as well as being secured to the strap first end region.

The strap second end region has a strap closure structure which is designed to grip the retainer assembly when the strap has been passed around the support element on the animal collar and folded to form a loop about the support element. Depending on the configuration of the retainer assembly, the strap closure structure can attach to either the base element or the clamp element, either alone or in combination with a structure formed on the strap first end region.

The strap can be provided with at least one restraining element that is positioned such that it is interposed between the support element and the tags, thereby blocking contact of the support element with the tags to further suppress noise. Such restraining elements can be provided by one or more protrusions attached to the strap.

An alternative restraining element can be provided by a block portion of the strap, in which case the strap is formed with a second retainer passage in the first end region and may also have a third passage located between the first end region and the second end region. These passages are spaced such that the strap can be bent to align the retainer passages to receive the retainer shaft, with the block portion of the strap forming an arch over the tags mounted on the retainer shaft.

The retainer assembly can be provided by a bolt and corresponding nut, where the threaded portion of the bolt serves as the shaft and the bolt head serves as the base element. The strap first end region can be provided with a shaped recess that non-rotatably engages the bolt head so as to avoid twisting as the nut is tightened on the shaft. In this embodiment, the associated nut serves as the clamp element, and the strap closure structure is designed to grippably engage the nut. When the strap is folded with an arched block portion, the shaped recess can be provided in a protrusion centered about the third passage.

In another embodiment where the strap has three passages and is folded, a rivet assembly is employed as the retainer assembly to semi-permanently attach the tags to the strap. When secured to the strap first end region, the rivet and the strap first end region form a stepped structure that can be engaged by an aperture on the strap second end region that is sized to attach onto the stepped structure so as to provide the closure structure.

BRIEF DESCRIPTION OF THE FIGURES

FIG. 1 shows the components of the hanger exploded, while FIG. 2 shows the hanger when in use attaching tags to a D-ring of a pet collar which serves as a support structure for this embodiment. The hanger has a flexible strap and a retainer assembly. The retainer assembly has a bolt that engages a recess in a strap first end region and a threaded shaft that passes through a first retainer passage in the strap first end region. The tags may be placed onto the shaft and secured thereon by a nut, which threadably engages the shaft and serves as a clamp element to clamp the tags against the strap first end region as the nut is tightened on the shaft, thereby stopping the tags from rattling against each other. The strap is formed of resilient material and has a second end region provided with a nut-engaging passage that serves as a strap closure structure. The nut-engaging passage can be releasably secured to the nut to form the strap into a closed loop about the D-ring, as shown in FIG. 2. The grippable engagement of the nut-engaging passage with the nut serves to stop the nut from rotating to prevent it from loosening on the threaded shaft.

FIG. 4 illustrates the components of the hanger prior to assembly.

FIG. 5 illustrates the hanger shown in FIG. 4 when the strap first end region has been folded to a position where it is ready to receive the bolt and nut.

FIG. 6 illustrates the hanger shown in FIGS. 4 and 5 when the bolt and nut have been secured to the strap, with two pet tags mounted on the retainer shaft, and the strap second end region has been looped over a D-ring and secured to the nut to attach the tags to the D-ring. The strap block portion of the strap first end region forms a barrier that completely blocks access between the tags and the D-ring to positively prevent contact therebetween.

FIGS. 7-9 illustrate another reduced-noise pet tag hanger of the present invention that employs a strap first end region that folds to form a strap block portion that blocks access between the tags and a support structure. This embodiment differs in the retainer assembly employed to secure the pet tags in the hanger. In this embodiment, the retainer base element and the retainer shaft are provided by a male rivet element, while the retainer clamp element is provided by a female rivet element that is designed to clampably engage the retainer shaft of the male rivet element. FIG. 7 illustrates the components of the hanger before assembly.

FIG. 8 illustrates the hanger shown in FIG. 7 when the strap first end region has been folded in preparation to installing the rivet to secure the tags to the strap.

FIG. 9 is a partial view showing the rivet and the strap second end region, which in this embodiment has a second end aperture that engages the rivet to provide a strap closure structure. The strap first end region is formed with a cylindrical protrusion sized such that the second end aperture of the strap second end region can be installed thereover. The male rivet element has a rivet head that is greater in diameter than the second end aperture, and when the retainer assembly elements are installed onto the strap, the rivet head abuts the cylindrical protrusion and extends therebeyond to form a stepped structure. The second end aperture of the strap second end region can be stretched to pass over the rivet head and onto the cylindrical protrusion, and is retained thereon by the enlarged rivet head.

FIG. 10 shows the rivet and strap first and second end regions when the second end aperture has been passed over the rivet head and is retained on the cylindrical protrusion by the rivet head.

DETAILED DESCRIPTION

Figure 1:
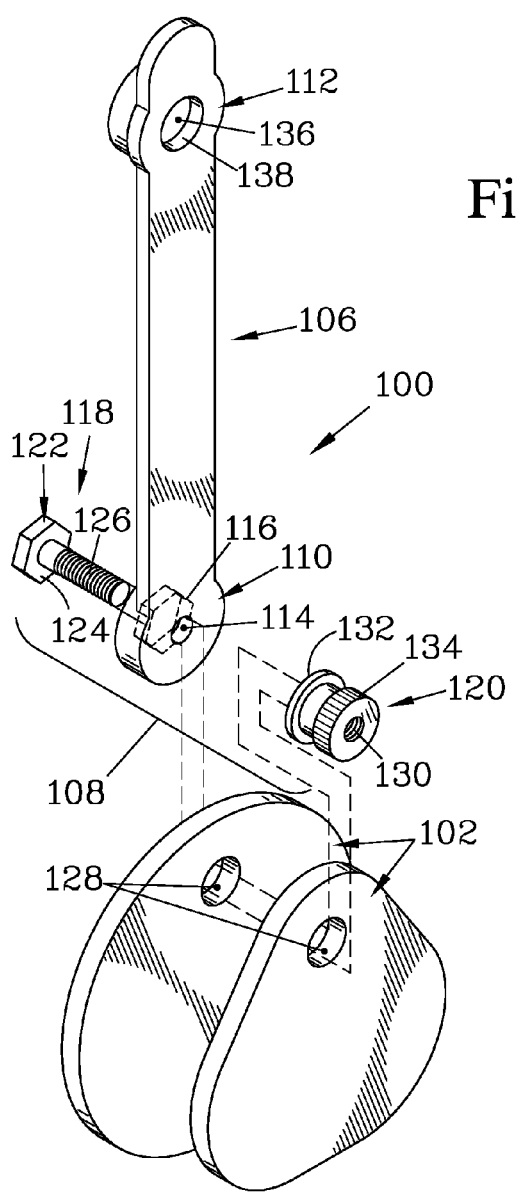
FIGS. 1 and 2 illustrate a reduced-noise pet tag hanger that forms one embodiment of the present invention.
Figure 2:
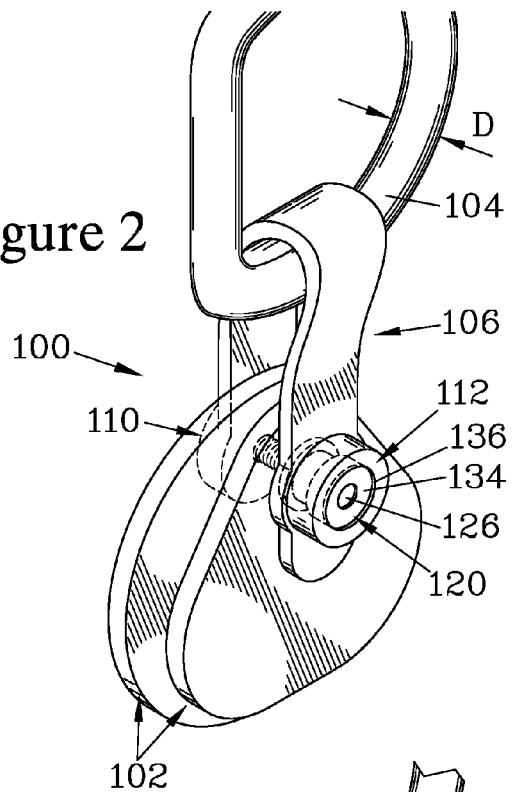

FIGS. 1 and 2 illustrate a reduced-noise pet tag hanger 100 that serves to attach one or more tags 102 to a support structure on an animal collar, which is illustrated in FIG. 2 as a D-ring 104. The tag hanger 100 has a flexible strap 106 and a retainer assembly 108. FIG. 1 shows the tag hanger 100 prior to assembly, while FIG. 2 shows the tag hanger 100 after the retainer assembly 108 has attached the tags 102 to a first end region 110 of the strap 106, and after the strap 106 has subsequently been passed around the D-ring 104 and a strap second end region 112 has been secured to the retainer assembly 108 to attach the tags 102 to the D-ring 104.

As shown in FIG. 1, the strap first end region 110 has a first retainer passage 114 therethrough. In the tag hanger 100, the strap first end region 110 also has a hexagonal recess 116 that terminates one end of the first retainer passage 114. The retainer assembly 108 has a bolt 118 and a nut 120, the bolt 118 having a bolt head 122 that serves as a retainer base element having a planar base element bearing surface 124, and a threaded retainer shaft 126 extending from the base element bearing surface 124. The first retainer passage 114 is sized to accept the retainer shaft 126, but blocks the bolt head 122. When the hexagonal recess 116 is provided, it is configured to accept the bolt head 122 and to prevent it from rotating when received therein. The tags 102 are each provided with a hanger passage 128 that can be passed over the retainer shaft 126 and placed against the strap first end region 110. Typically, the pet tags 102 have a thickness of about 1.5 mm, and the retainer shaft 126 is selected to have sufficient length to accommodate from one to four tags.

The nut 120 serves as a clamp element, having a threaded passage 130 configured to threadably engage the retainer shaft 126 of the bolt 118 and a planar clamp element bearing surface 132 sized such as to be blocked from passing through the hanger passages 128 of the tags 102. When the nut 120 is turned, the engagement of the threaded passage 130 with the retainer shaft 126 serves to advance the clamp element bearing surface 132 toward the base element bearing surface 124 on the bolt head 122, thereby clamping the tags 102 against the strap first end region 110; this prevents the tags 102 from jangling together, while allowing them to be fanned out about the retainer shaft 126 to allow viewing the information imprinted on each of the tags 102. To facilitate rotation of the nut 120 by the user, it can be provided with a generally cylindrical knurled portion 134, while rotation of the bolt 118 is prevented by the engagement of the bolt head 122 with the hexagonal recess 116 in the strap first end region 110. The threadable engagement between the threaded passage 130 and the retainer shaft 126 provides the nut 120 with means for grippably engaging the retainer shaft 126.

The strap second end region 112 has a second end aperture 136 that serves as a strap closure structure, being configured such that it can grippably engage the knurled portion 134 of the nut 120; typically, the strap 106 is formed from a durable, resilient material such as a polyurethane rubber. After the strap second end region 112 has been passed around the D-ring 104, the second end aperture 136 can be frictionally fitted over the knurled portion 134 of the nut 120 to attach the tag hanger 100 and the tags 102 onto the D-ring 104, as shown in FIG. 2. The frictional engagement of the second end aperture 136 with the knurled portion 134 also serves to limit rotation of the nut 120, thereby preventing the nut 120 from loosening on the retainer shaft 126. For greater security, the second end aperture 136 can be provided with a shoulder 138 (shown in FIG. 1) that elastically stretches to pass over the knurled portion 134, and which subsequently abuts against the knurled portion 134 to more positively retain the second end aperture 136 on the nut 120.

While the tag hanger 100 is shown attached to the D-ring 104, it should be appreciated that the tag hanger 100 could be attached to alternative support structures worn by an individual. While the tag hanger 100 serves to clamp the tags 102 against the strap first end region 110 to prevent the tags 102 from striking together and making noise, there is still a possibility for noise resulting from contact between the tags 102 and the D-ring 104 if the combined thickness of the tags 102 is close to or greater than a diameter D of the D-ring 104. To prevent such noise, particularly when multiple tags are to be attached or when the tag hanger attaches to a support structure having a smaller diameter, the embodiments discussed below include one or more restraining elements to limit access between the tags and the support structure to which the hanger is designed to attach.

Figure 3:
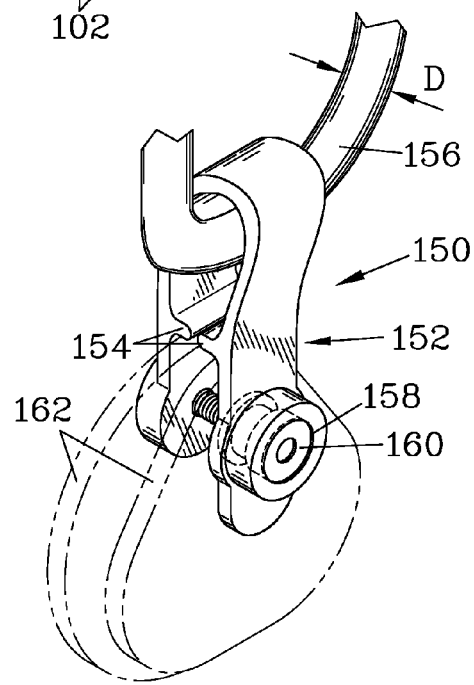
FIG. 3 illustrates a reduced-noise pet tag hanger that is similar to the embodiment shown in FIGS. 1 and 2, but which is provided with a pair of opposed restraining elements that serve to limit access between the tags and the D-ring to prevent contact therebetween, thereby reducing noise and wear. The restraining elements in this embodiment are protrusions that extend toward each other when the strap second end region grippably engages the nut, limiting access between the tags and the D-ring to a space less than the diameter of the D-ring to prevent it from contacting the tags. Typically, the hangers of the present invention are designed to accommodate from 1 to 4 tags, and thus the protrusions should be configured such that they do not interfere with the engagement of the strap closure structure with the nut when only one tag is installed, while reducing the access space to less than the diameter of the D-ring when four tags are installed.

FIG. 3 illustrates a reduced-noise pet tag hanger 150 that has many features in common with the tag hanger 100 discussed above, but which has a strap 152 that is provided with a pair of restraining protrusions 154. When the strap 152 is looped through a D-ring 156 and a strap second end region 158 has been secured to a retainer nut 160, the restraining protrusions 154 are positioned opposite to each other and are interposed between the D-ring 156 and tags 162 that are attached to the strap 152. The restraining protrusions 154 limit access between the tags 162 and the D-ring 156 to a gap significantly smaller than the diameter D of the D-ring 156, and thereby block contact therebetween to reduce noise and wear on the tags 162.

Since the tag hanger 150 is typically designed to accommodate from 1 to 4 tags 162, the restraining protrusions 154 should be configured such that they do not interfere with the engagement of the strap second end region 158 with the retainer nut 160 when the tag hanger 150 is employed with only one tag 162, while reducing the access space to less than the diameter D when four tags 162 are attached.

Figures 4, 5, 6:
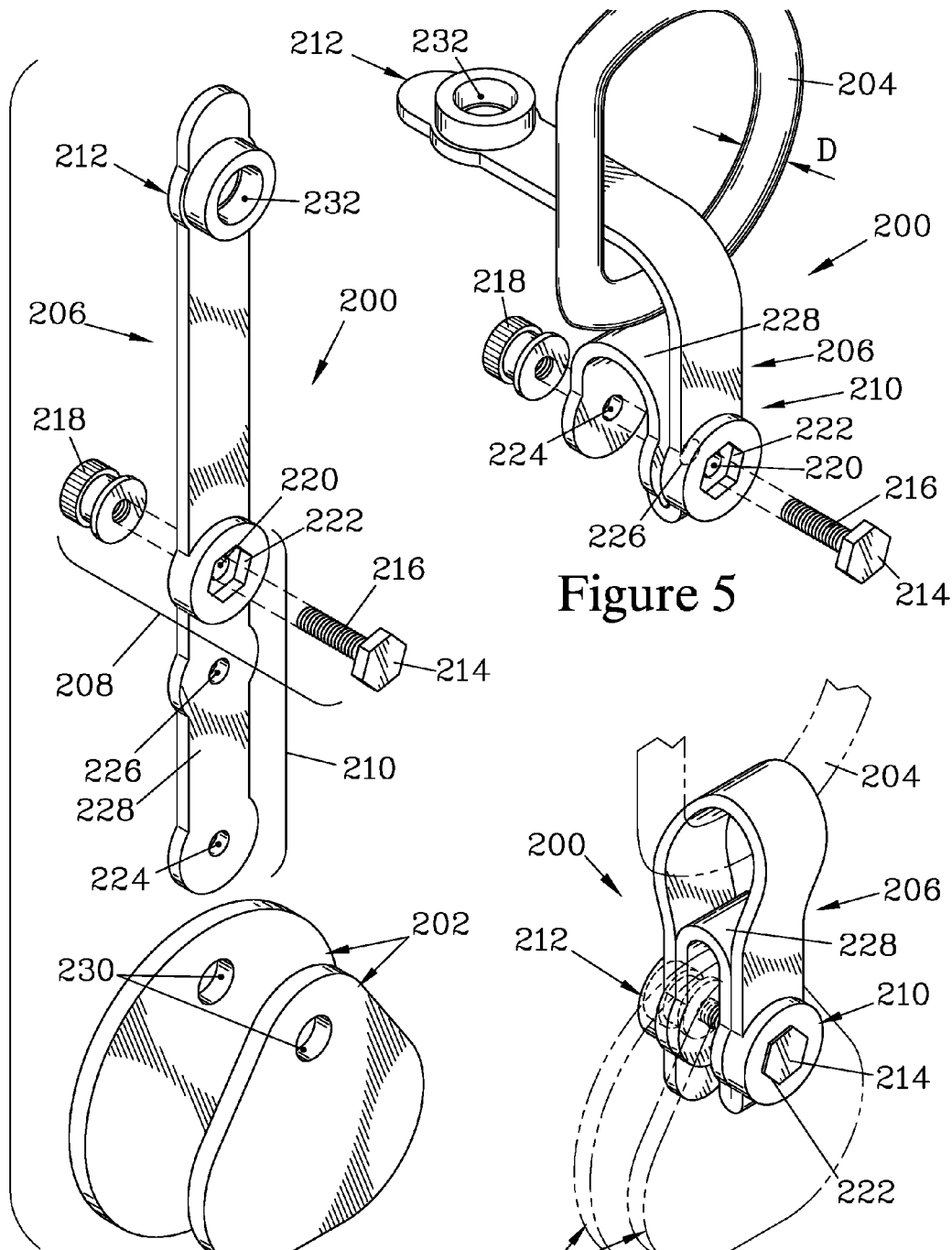
FIGS. 4-6 illustrate another pet tag hanger of the present invention, which employs an alternative structure for preventing contact between the tags and the support structure. In this embodiment, the strap has a strap first end region that folds and engages the retainer assembly such that a strap block portion is interposed between the tags mounted on the shaft and the support structure encircled by the loop. Again, a bolt provides a retainer base element and a threaded shaft, while a nut provides a retainer clamp element; however, in this embodiment a portion of the strap first end region is interposed between the nut and the tags to further isolate the tags to prevent noise, as well as facilitating a compressive load on the tags when the strap is formed from a resilient material.

FIGS. 4-6 illustrate a pet tag hanger 200 that forms another embodiment of the present invention, which employs an alternative structure for preventing contact between pet tags 202 and a support structure on an animal collar, again illustrated as a D-ring 204. The tag hanger 200 again has a strap 206 and a retainer assembly 208. The strap 206 has a strap first end region 210 and a strap second end region 212, while the retainer assembly 208 has a retainer base element 214, a retainer shaft 216, and a retainer clamp element 218.

The strap first end region 210 again has a first retainer passage 220 and an associated hexagonal recess 222. However, in this embodiment the strap first end region 210 is also provided with a second retainer passage 224 and a third retainer passage 226, with a strap block portion 228 positioned between the second retainer passage 224 and the third retainer passage 226. As shown in FIG. 5, the strap first end region 210 can be folded so as to align the retainer passages (220, 224, 226) such that the retainer shaft 216 can be passed through the first retainer passage 220, the third retainer passage 226, hanger passages 230 provided in the tags 202, and then through the second retainer passage 224 before being grippably engaged by the clamp element 218 (as shown in FIG. 6). When so folded, the strap block portion 228 positioned between the retainer second and third passages (224, 226) arches over the tags 202 to positively block them from contact with the D-ring 204. Additionally, the portion of the strap first end region 210 that surrounds the retainer second passage 224 is interposed between the clamp element 218 and the tags 202 to further reduce noise and wear.

The strap second end region 212 is again formed with a second end aperture 232 that is configured to grippably engage the clamp element 218 so as to serve as a second end closure structure to secure the strap 206 to the D-ring 204.

The folding configuration of the strap first end region 210 allows the strap 206 to be formed as a substantially planar structure with limited depth, simplifying fabrication by molding or 3-dimensional printing.

FIGS. 7-10 illustrate reduced-noise pet tag hanger 300 that forms another embodiment of the present invention, and which again has a strap 302 with a strap first end region 304 that folds to form a strap block portion 306. The strap first end region 304 has a first retainer passage 308, a second retainer passage 310, and a third retainer passage 312, with the strap block portion 306 positioned between the second retainer passage 310 and the third retainer passage 312.

The tag hanger 300 employs a retainer assembly 314 that includes a male rivet element 316 having a rivet head 318, which serves as a retainer base element, and a retainer shaft 320. The retainer assembly 314 also has a female rivet element 322 that clampably engages the retainer shaft 320 of the male rivet element 316 to serve as a retainer clamp element. Typically, the clampable engagement is semi-permanent, requiring the retainer assembly 314 to be forcibly disassembled or broken and replaced if it is desired to change the tags to be attached to the tag hanger 300.

Again, the strap first end region 304 is designed to be folded so that the retainer passages (308, 310, 312) are aligned (as shown in FIG. 8) and the retainer shaft 320 can be passed therethrough before being gripped by the female rivet element 322, forming the strap block portion 306 into an arch. The strap first end region 304 is provided with a cylindrical protrusion 324 surrounding the second retainer passage 310. The cylindrical protrusion 324 has a protrusion diameter $D_P$ and extends from the remainder of the strap first end region 304 by a protrusion thickness $T_P$. The rivet head 318 has a head diameter $D_H$ that is somewhat greater than the protrusion diameter $D_P$, which forms a stepped configuration when the rivet head 318 abuts the cylindrical protrusion 324, as shown in FIG. 9.

It should be appreciated that a rivet could be employed having a rivet head that is formed so as to incorporate the step, in which case the cylindrical protrusion on the strap first end region would not be necessary. It should also be appreciated that the orientation of the retainer assembly could be reversed such that the female rivet element abuts the cylindrical protrusion. Furthermore, it should be appreciated that alternative shapes could be employed rather than a cylindrical protrusion and circular aperture.

The strap 302 has a strap second end region 326 that is provided with a second end aperture 328 that provides a strap closure structure. The second end aperture 328 has an aperture diameter $D_A$ that is less than head diameter $D_H$ but at least as large as the protrusion diameter $D_P$, and the strap second end region 326 has an aperture thickness $T_A$ that is no greater than the protrusion thickness $T_P$. With these dimensions, the second end aperture 328 can be stretched to pass over the rivet head 318 so as to encircle the cylindrical protrusion 324, and is retained on the cylindrical protrusion 324 by the rivet head 318 as shown in FIG. 10.

Figure 11:
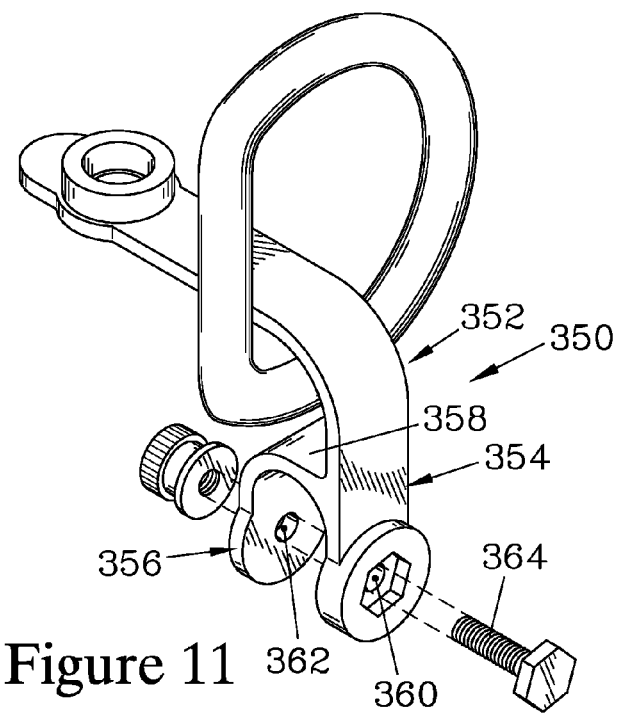
FIG. 11 is an illustration of an alternative reduced-noise pet tag hanger that has many features in common with the hanger shown in FIGS. 4-6, but which does not require the strap first end region to be folded. Instead, the strap first end region has a free leg that can be bent to form a strap block portion. While the resulting strap is simpler in form, it may be more difficult to fabricate than the strap shown in FIGS. 4-6, which is a substantially planar structure.

FIG. 11 shows a reduced-noise pet tag hanger 350 that has many features in common with the tag hanger 200 shown in FIGS. 4-6, but which has a strap 352 with a strap first end region 354 that is not folded. In the tag hanger 350, the strap 352 is formed as a Y-shaped structure such that the strap first end region 354 has a first region free leg 356 on which a strap block portion 358 is provided. While simpler to employ than the strap 206 shown in FIGS. 4-6, the strap 352 may be more difficult to fabricate since it is not a generally planar structure.

The strap first end region 354 has a first retainer passage 360, and a retainer second passage 362 is provided on the first region free leg 356, which can be bent to arch the strap block portion 358 and to align the retainer second passage 362 with the retainer first passage 360 before inserting a retainer shaft 364 therethrough.

Figure 12:
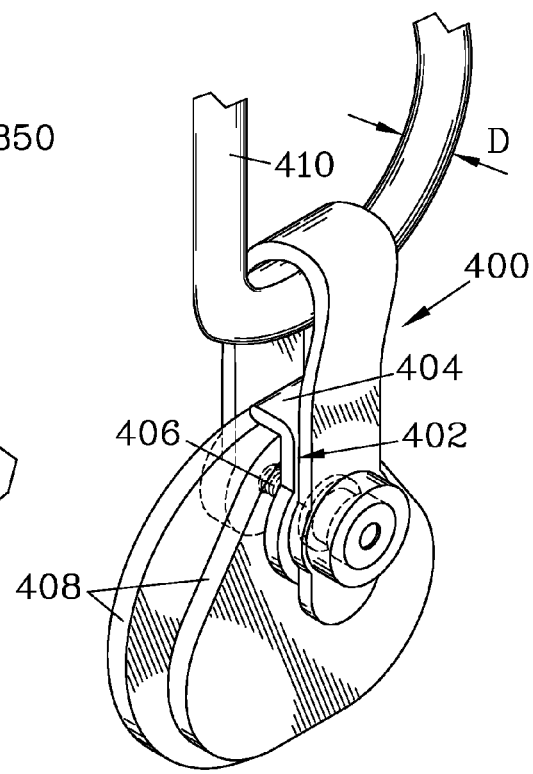
FIG. 12 is an illustration of a reduced-noise pet tag hanger that has many features in common with the hanger shown in FIGS. 1 and 2, but which includes a restraining tab that is provided on a washer that is interposed between the pet tags and the nut of the retainer assembly.

FIG. 12 shows a reduced-noise pet tag hanger 400 that can employ many elements similar to those of the tag hanger 100 shown in FIGS. 1 and 2, but which additionally includes a restraining washer 402. The restraining washer 402 has a restraining tab 404, and is placed onto a retainer shaft 406 such that the restraining tab 404 extends over pet tags 408 that are also placed onto the retainer shaft 406. The restraining tab 404 is interposed between the tags 408 and a D-ring 410 to block access therebetween.

Figure 13:
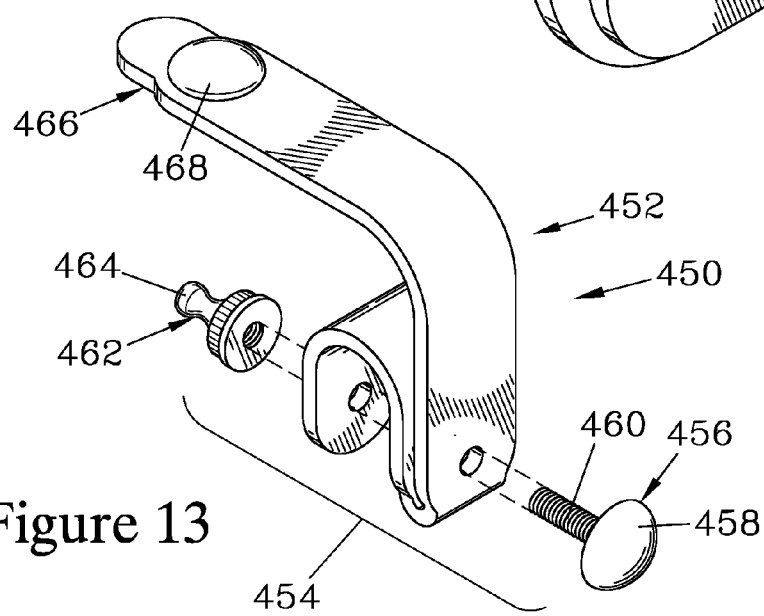
FIG. 13 is an illustration of a reduced-noise pet tag hanger that is functionally similar to the hanger shown in FIGS. 4-6, but which employs a different strap closure structure. In this embodiment, the retainer clamp is a nut having a male snap protrusion formed thereon, and the strap closure structure is a female snap receiver attached to the strap second end region. The use of a snap allows the use of a wider variety of materials for the strap, as it need not be a material that can grippably engage the nut of the retainer assembly.

FIG. 13 is an illustration of a reduced-noise pet tag hanger 450 that is functionally similar to the hanger shown in FIGS. 4-6, but which allows the use of a wider variety of materials for a strap 452, as the strap 452 is not required to frictionally grip a retainer assembly 454. Thus, the material of the strap 452 can be selected for a desirable appearance. In the tag hanger 450, the retainer assembly 454 has a bolt 456, which serves as both a retainer base element 458 and a retainer shaft 460, and has a nut 462 that threadably engages the retainer shaft 460 to serve as a retainer clamp element. The nut 462 is formed with a male snap protrusion 464, and the strap 452 has a strap second end region 466 that is provided with a female snap receiver 468 that can snap onto the male snap protrusion 464 to serve as a strap closure structure.

While the novel features of the present invention have been described in terms of particular embodiments and preferred applications, it should be appreciated by one skilled in the art that substitution of materials and modification of details can be made without departing from the spirit of the invention.

What is claimed is:

1. Reduced-noise tag hanger for attaching substantially planar tags with hanger passages to a support structure worn by an individual, the hanger comprising:
    a flexible strap having a strap first end region with a first retainer passage therethrough and a strap second end region having a strap closure structure; and
    a retainer assembly having,
        a retainer base element having a planar base element bearing surface,
        a retainer shaft attached to said retainer base element so as to extend perpendicularly from said base element bearing surface and passing through said first retainer passage, and
        a retainer clamp element having a planar clamp element bearing surface and means for grippably engaging said retainer shaft with said clamp element bearing surface opposed to said base element bearing surface with said retainer shaft extending therebetween,
        said means for grippably engaging said retainer shaft allowing said retainer clamp element to be advanced along said retainer shaft towards said retainer base element so as to clamp the tags therebetween when the tags are placed such that said retainer shaft passes through the hanger passages, thereby securing the tags with respect to said strap first end region,
        said strap closure structure being configured to releasably secure to said retainer assembly so as to form a closed loop about the support structure to attach the tags with respect thereto.

2. The tag hanger of claim 1 for use when the support structure is a D-ring formed with a support diameter D, the tag hanger further comprising:
    at least one restraining element associated with said strap, said restraining element being configured such that said restraining element is interposed between the tags and the support structure when said retainer assembly is installed on said strap and said strap closure structure is secured to said retainer assembly to form a closed loop about the support structure, said at least one restraining element limiting access between the tags and the support structure to a space no greater than the support diameter D.

3. The tag hanger of claim 2 wherein said retainer base element and said retainer shaft are both provided by a threaded bolt, and said retainer clamp element is provided by a nut that threadably engages said retainer shaft,
    further wherein said strap first end region includes a bolt-engaging recess configured to be non-rotatably engaged by said retainer base element, and
    yet further wherein said strap closure structure is configured to engage said retainer clamp element and acts to grip said retainer clamp element to prevent said retainer clamp from rotating on said retainer shaft.

4. The tag hanger of claim 2 wherein said strap first end region further comprises:
    a second retainer passage; and
    a strap block portion interposed between said first retainer passage and said second retainer passage such that, when said strap first end region is flexed to position said second retainer passage in alignment with said first retainer passage, said strap block portion is positioned so as to serve as said at least one restraining element.

5. The tag hanger of claim 1, wherein the tag hanger is configured such that a plurality of the tags are stackable over said retainer shaft.

6. The tag hanger of claim 1, wherein the tag hanger is configured to provide an assembled state in which:
   a plurality of the tags are stacked over said retainer shaft;
   said retainer clamp element is threadably engaged with said retainer shaft; and
   a structure of the hanger is disposed between said retainer clamp element and the plurality of tags.

7. The tag hanger of claim 6, wherein said structure is a segment of said strap.

8. A reduced-noise tag hanger for attaching substantially planar tags with hanger passages to a support structure worn by an individual, the hanger comprising:
   a flexible strap having a strap first end region and a strap second end region that is provided with a strap closure structure; and
   a retainer assembly having,
      a retainer base element,
      a retainer shaft extending from said retainer base element,
      wherein said retainer base element and said retainer shaft are both provided by a threaded bolt, and
      a retainer clamp element configured to grippably engage said retainer shaft, wherein said retainer clamp element is provided by a nut that threadably engages said retainer shaft,
      said retainer assembly being configured such that grippable engagement of said retainer shaft by said clamp element serves to clamp the tags with respect to said strap first end region when said retainer shaft passes through the hanger passages of the tags, and
      said strap closure structure being configured to releasably attach to said retainer assembly after passing around a portion of the support structure to attach said strap to the support structure,
      wherein said strap first end region includes a bolt-engaging recess configured to be nonrotatably engaged by said retainer base element, and
      further wherein said strap closure structure is configured to engage said retainer clamp element and acts to grip said retainer clamp element to prevent said retainer clamp element from rotating on said retainer shaft.

9. The tag hanger of claim 8 wherein said strap first end region has a first retainer passage therethrough, and wherein said retainer base element has a base element bearing surface,
   said retainer shaft extending from said retainer base element such that said base element bearing surface abuts said strap first end region when said retainer shaft passes through said first retainer passage in said strap first end region; and
   a clamp element bearing surface on said retainer clamp element configured so as to be opposed to said base element bearing surface when said retainer clamp element grippably engages said retainer shaft, such that grippable engagement of said retainer shaft by said retainer clamp element serves to clamp the tags and a portion of said strap first end region between said bearing surfaces.

10. The tag hanger of claim 9 for use when the support structure has a support diameter D, the tag hanger further comprising:
    at least one restraining element associated with said strap, said restraining element being configured such that said restraining element is interposed between the tags and the support structure when said retainer assembly is installed on said strap and said strap closure structure is secured to said retainer assembly to form a closed loop about the support structure, said at least one restraining element limiting access between the tags and the support structure to a space no greater than the support diameter D.

11. The tag hanger of claim 10 wherein said strap first end region further comprises:
    a second retainer passage; and
       a strap block portion interposed between said first retainer passage and said second retainer passage such that, when said strap first end region is flexed to position said second retainer passage in alignment with said first retainer passage, said strap block portion is positioned so as to serve as said at least one restraining element.

12. The tag hanger of claim 11 wherein said strap first end region is provided with a third retainer passage that can be aligned with said first retainer passage, and wherein said strap block portion is interposed between said second retainer passage and said third retainer passage.

13. The tag hanger of claim 8, wherein the tag hanger is configured such that a plurality of the tags are stackable over said retainer shaft.

14. The tag hanger of claim 8, wherein the tag hanger is configured to provide an assembled state in which:
    a plurality of the tags are stacked over said retainer shaft;
    said retainer clamp element is threadably engaged with said retainer shaft; and
    a structure of the hanger is disposed between said retainer clamp element and the plurality of tags.

15. The tag hanger of claim 14, wherein said structure is a segment of said strap.

* * * * *